United States Patent

Worschech et al.

[11] Patent Number: 5,302,644
[45] Date of Patent: Apr. 12, 1994

[54] STABILIZERS CONTAINING KETOFATTY ACID GLYCERIDES FOR CA/ZN-STABILIZED PVC MOLDING COMPOUNDS

[75] Inventors: Kurt Worschech, Loxstedt; Gerhard Stoll, Korschenbroich; Ernst-Udo Brand; Peter Wedl, both of Bremerhaven, all of Fed. Rep. of Germany

[73] Assignee: Neynaber Chemie GmbH, Loxstedt, Fed. Rep. of Germany

[21] Appl. No.: 956,030

[22] PCT Filed: May 29, 1991

[86] PCT No.: PCT/EP91/01000

§ 371 Date: Dec. 7, 1992

§ 102(e) Date: Dec. 7, 1992

[87] PCT Pub. No.: WO91/18945

PCT Pub. Date: Dec. 12, 1991

[30] Foreign Application Priority Data

Jun. 7, 1990 [DE] Fed. Rep. of Germany ....... 4018293

[51] Int. Cl.$^5$ ............ C08K 5/15; C08K 5/10; C08K 5/09; C09K 15/32
[52] U.S. Cl. ................. 524/114; 524/285; 524/294; 524/295; 524/299; 524/309; 524/313; 524/386; 524/399; 524/400; 252/400.52; 252/400.61; 252/407
[58] Field of Search ............. 252/400.52, 400.61, 252/407; 524/114, 308, 309, 313, 399, 400

[56] References Cited

U.S. PATENT DOCUMENTS

| | | | |
|---|---|---|---|
| 4,083,816 | 4/1978 | Frankel et al. | 524/313 |
| 4,637,887 | 1/1987 | Worschech et al. | 252/56 R |
| 4,837,257 | 6/1989 | Aza et al. | 524/399 |
| 5,010,123 | 4/1991 | Worschech et al. | 524/114 |
| 5,118,741 | 6/1992 | Amano et al. | 524/399 |

FOREIGN PATENT DOCUMENTS

| | | |
|---|---|---|
| 0022087 | 11/1983 | European Pat. Off. |
| 0166201 | 1/1986 | European Pat. Off. |
| 0337237 | 10/1989 | European Pat. Off. |
| 857364 | 10/1952 | Fed. Rep. of Germany |
| 1907768 | 6/1971 | Fed. Rep. of Germany |
| 2436007 | 2/1975 | Fed. Rep. of Germany |
| 2600516 | 7/1976 | Fed. Rep. of Germany |
| 2645870 | 4/1977 | Fed. Rep. of Germany |
| 2728862 | 1/1978 | Fed. Rep. of Germany |
| 2728865 | 1/1978 | Fed. Rep. of Germany |
| 3334600 | 4/1985 | Fed. Rep. of Germany |
| 3812014 | 10/1989 | Fed. Rep. of Germany |
| 2383987 | 10/1978 | France |
| 43-029735 | 6/1968 | Japan |

OTHER PUBLICATIONS

Kunststoffbandbuch, Becker/Braun, 1986, pp. 570–586, 595–608, 712–726.
Acta Chemica Scandinavica, 6, 1952, 1157–1174.
Chemical Abstracts, vol. 79, No. 21, Nov. 26, 1973, (Columbus, Ohio, US) p. 358 Abstract 125878e.

*Primary Examiner*—Paul R. Michl
*Assistant Examiner*—Tae H. Yoon
*Attorney, Agent, or Firm*—Ernest G. Szoke; Wayne C. Jaeschke; Real J. Gradmaison

[57] ABSTRACT

Abstract of the Disclosure Stabilizer combination for Ca/Zn-stabilized PVC molding materials, containing (a) Ca salts of saturated, straight-chain $C_8$–$C_{34}$ fatty acids, (b) Zn salts of saturated, straight-chain or branched $C_8$–$C_{22}$ fatty acids, (c) epoxidized glycerides of unsaturated, straight-chain $C_{16}$–$C_{22}$ fatty acids having an oxirane number of 6 to 8 and iodine number less than 5, and (d) ketofatty acid glycerides of general formula $R^1COO-CH_2-(R^2COO)CH-CH_2-OCR_3$, in which the groups $R^1COO-$, $R^2COO-$, and $R^3COO-$ stand for residues of ketofatty acids with 16 to 22 carbon atoms and optionally residues of fatty acids with 12 to 22 carbon atoms, and 60 to 100 wt.% of the groups are derived from the ketofatty acids and 40 to 0 wt.% from the fatty acids, with a ratio of the total weight of calcium salts of component (a) and zinc salts of component (b) to the percentage by weight of the ketofatty acid glycerides of components (d) in the range 1:1 to 1:50, result in favorable transparency values of the PVC molding materials stabilized with them.

18 Claims, No Drawings

5,302,644

STABILIZERS CONTAINING KETOFATTY ACID GLYCERIDES FOR CA/ZN-STABILIZED PVC MOLDING COMPOUNDS

BACKGROUND OF THE INVENTION

1. Field of the Invention

This invention relates to stabilizer combinations for Ca/Zn-stabilized PVC molding compounds.

The processing of rigid PVC molding compounds by injection molding, bottle blowing, calendering or the like at relatively high material temperatures requires optimal melt flow. If the end products are required to show high transparency, PVC types having low K values, for example in the range from 55 to 63, have to be used. Establishing good melt flow properties requires relatively high dosages of lubricants. The lubricants have to show optimal compatibility with the PVC compounds because only then can glassclear products, such as bottles or films, be produced.

2. Discussion of Related Art

Known lubricants of the type mentioned above are, for example, partial esters of glycerol, such as glycerol monooleate, glycerol dioleate and glycerol monostearate, fatty alcohols having chain lengths in the range from $C_{16}$ to $C_{18}$, phthalic acid esters of the fatty alcohols mentioned and also hydrogenated castor oil, i.e. the glycerol ester of 12-hydroxystearic acid. These and other lubricants are described, for example, in Becker/Braun, Kunststoffhandbuch 2/1 (Polyvinylchlorid), Carl Hanser Verlag, München, 1986, pages 570–586. Other lubricants for PVC molding compounds described in the prior art include dihydroxyfatty acid glycerides obtained by hydrogenation of the corresponding epoxyfatty acid glycerides (EP-A 0 166 201) and ketofatty acid glycerides of which the ketofatty acid components are derived from mixtures of 9- and 10-ketostearic acid (DE-A 33 34 600). According to EP-A 0 166 201, dihydroxyfatty acid glycerides containing impurities of glycerides of $C_{18}$ ketocarboxylic acid glycerides are also suitable for stabilizing Ca/Zn-stabilized PVC molding compounds. However, the PVC molding compounds obtained in this way contain only very small quantities (at most approx. 0.08% by weight) of the ketofatty acid glycerides.

Ca/Zn-stabilized PVC molding compounds are used in particular for the packaging of foods. A typical example of this application are water bottles, particularly for so-called still waters and $CO_2$-containing waters. Compounds of the type in question are additionally stabilized with epoxidized triglycerides, more particularly epoxidized soybean oil. Additional co-stabilizers, for example 1,3-diketones and/or derivatives of dihydropyridine, may be used because the stabilizing effect of CaZn systems is not very pronounced. Molding compounds of this type may contain diesters of ethylene glycol with saturated, straight-chain $C_{18}$ fatty acids as internal lubricant. Thus, DE-A 38 12 014 describes a stabilizer combination for Ca/Zn-stabilized PVC molding compounds containing Ca salts of saturated, straight-chain $C_{8-18}$ fatty acids, Zn salts of saturated, straight-chain or branched $C_{8-18}$ fatty acids, epoxidized glycerides of unsaturated straight-chain $C_{16-22}$ fatty acids having oxirane values of 6 to 8 and iodine values of less than 5 and the above-mentioned ethylene glycol diesters of saturated, straight-chain $C_{16-18}$ fatty acids. The compatibility of the ethylene glycol diesters mentioned above with PVC molding compounds is comparable with that of hydrogenated castor oil; i.e. PVC molding compounds treated with these lubricants have substantially the same transparency properties.

Accordingly, the problem addressed by the present invention was to provide a stabilizer combination for Ca/Zn-stabilized PVC molding compounds containing an internal lubricant which would be superior in its effect to known internal lubricants, more particularly hydrogenated castor oil and the diester of ethylene glycol with saturated straight-chain $C_{16-18}$ fatty acids.

Description of the Invention

Other than in the operating examples, or where otherwise indicated, all numbers expressing quantities of ingredients or reaction conditions used herein are to be understood as modified in all instances by the term "about".

According to the invention, this problem has been solved by a stabilizer combination for Ca/Zn-stabilized PVC molding compounds which contains the following components:

a) Ca salts of saturated straight-chain $C_{8-34}$ fatty acids,
b) Zn salts of saturated, straight-chain or branched $C_{8-22}$ fatty acids,
c) epoxidized glycerides of unsaturated, straight-chain $C_{18-22}$ fatty acids having oxirane values of 6 to 8 and iodine values of less than 5 and
d) ketofatty acid glycerides corresponding to general formula I

$$R^1COO-CH_2-(R^2COO)CH-CH_2-OOCR^3 \quad (I)$$

in which the groups $R^1COO-$, $R^2COO-$ and $R^3COO-$ represent residues of ketofatty acids containing 16 to 22 carbon atoms and, optionally, residues of fatty acids containing 12 to 22 carbon atoms and 60 to 100% by weight of the groups are derived from ketofatty acids and 40 to 0% by weight from the fatty acids, with a ratio of the total weight of Ca salts of component a and Zn salts of component b to the percentage by weight of ketofatty acid glycerides of component d in the range from 1:1 to 1:50.

The Ca salts of saturated, straight-chain $C_{8-34}$ fatty acids are derived from the corresponding synthetic or natural fatty acids, more particularly from the fatty acids occurring in natural fats and oils or in montan wax, for example from caprylic acid, capric acid, lauric acid, myristic acid, palmitic acid, stearic acid, behenic acid and montanic acid. Both salts of individual fatty acids and salts of fatty acid mixtures obtained from the natural raw materials are used.

The Zn salts of saturated, straight-chain or branched $C_{8-22}$ fatty acids may be derived, for example, from caprylic acid, capric acid, lauric acid, myristic acid, palmitic acid, stearic acid, behenic acid, 2-ethylhexanoic acid, isopalmitic acid and isostearic acid. In this case, too, salts of individual fatty acids and salts of fatty acid mixtures are equally suitable. The zinc salts may be used as neutral salts or in the form of their basic salts with the fatty acids mentioned.

The epoxidized glycerides of unsaturated, straight-chain $C_{18-22}$ fatty acids may contain epoxidized residues of the palmitoleic, oleic, elaidic, petroselic, linoleic, linolenic, erucic, arachidonic or clupanodonic acids occurring in natural fats and oils. Epoxidation products of fats and oils containing sufficient unsaturated fatty acid residues to guarantee the required oxirane values after epoxidation are preferably used in this case. Suitable starting materials for the production of epoxidized glycerides are, for example, rapeseed oil, colza oil, sunflower oil, coriander oil and soybean oil and also beef tallow and lard. The natural fats and oils are best epoxidized by the method known from the production of epoxide plasticizers, for example by reaction with peracetic acid in the presence of acidic catalysts or with performic acid formed in situ from formic acid and hydrogen peroxide (see DE-PS 857 364).

The ketofatty acid residues $R^1COO-$, $R^2COO-$ and $R^3COO-$ present in the ketofatty acid glycerides corresponding to general formula I are derived, for example, from ketopalmitic acid, ketostearic acid, ketoarachic acid and ketobehenic acid. The keto function may be situated in any positions of the fatty acid chain except at that end of the fatty alkyl chain which is remote from the carboxyl group. The corresponding ketofatty acids are described in the literature, cf. Acta Chemica Scandinavica 6, 1157–1174 (1952), and may be synthesized by any of the processes described therein. They may be converted into the ketofatty acid glycerides of general formula I by esterification with glycerol However, fatty acid glycerides which can be converted into the corresponding ketofatty acid glycerides by suitable chemical reactions are normally used for the production of the ketofatty acid glycerides corresponding to general formula I. For example, the catalytic rearrangement of castor oil (ricinoleic acid triglyceride) in the presence of hydrogen and Pd/carbon catalysts gives the corresponding derivative of 12-ketostearic acid. Mixtures of isomeric ketostearic acid glycerides can be obtained by converting glycerides of epoxidized unsaturated fatty acids into the corresponding ketofatty acid glycerides by heating in the presence of catalysts using the method described in DE-A 33 34 600. For example, mixed 9-and 10-ketostearic acid triglycerides are formed in the rearrangement of epoxidized oleic acid glycerides. After epoxation and rearrangement, petroselic acid glycerides, for example from coriander oil, give mixed 6- and 7-ketostearic acid triglycerides. In selecting suitable glycerides of unsaturated fatty acids containing 16 to 22 carbon atoms for the production of the ketofatty acid glycerides corresponding to general formula I, it is merely important to ensure that the starting compounds contain a sufficiently high percentage of residues of unsaturated fatty acids so that, ultimately, 60 to 100% by weight of the fatty acids in the ketofatty acid glycerides are derived from the ketofatty acids and 40 to 0% by weight from residues of other fatty acids containing 12 to 22 carbon atoms, for example lauric acid, myristic acid, palmitic acid, stearic acid and behenic acid, including mono- and/or dihydroxyfatty acids containing the same number of carbon atoms. In addition to the epoxidized coriander oil already mentioned, typical suitable starting materials are epoxidized oleic acid glycerides containing more than 60% by weight and, in particular, more than 70% by weight, based on fatty acid residues present, of epoxidized oleic acid, for example of the type present in epoxidized sunflower oil from new sunflower plants.

In one preferred embodiment of the invention, 70 to 100% by weight of the groups $R^1COO-$, $R^2COO-$ and $R^3COO-$ in the ketofatty acid glycerides corresponding to general formula I are derived from the ketofatty acids containing 16 to 22 carbon atoms and 30 to 0% by weight from the fatty acids containing 12 to 22 carbon atoms (including any monohydroxy and/or dihydroxyfatty acids of the same chain length which may be present).

In another advantageous embodiment of the invention, ketofatty acid residues present in the ketofatty acid glycerides corresponding to general formula I are derived from 12-ketostearic acid. As already mentioned, ketofatty acid glycerides such as these can be obtained by catalytic rearrangement of castor oil.

In another advantageous embodiment, ketofatty acid residues present in the ketofatty acid glycerides corresponding to general formula I are derived from mixtures of 9- and 10-ketostearic acids. As mentioned above, ketofatty acid glycerides such as these are obtainable from epoxidized oleic acid glycerides.

In another advantageous embodiment of the invention, ketofatty acid residues present in the ketofatty acid glycerides corresponding to general formula I are derived from mixtures of 6- and 7-ketostearic acids. As already mentioned, ketofatty acid glycerides such as these are obtainable from epoxidized petroselic acid glycerides.

A particularly advantageous stabilizer combination according to the invention has the following composition:

a) 1 to 16 parts by weight and, more particularly, 2 to 10 parts by weight of the Ca salts of saturated straight-chain $C_{14-34}$ fatty acids expressed as Ca behenate,
b) 0.6 to 4.0 parts by weight and, more particularly, 1.2 to 2.4 parts by weight of the Zn salts of saturated, straight-chain or branched $C_{8-22}$ fatty acids expressed as Zn octoate,
c) 40 to 160 parts by weight and, more particularly, 60 to 120 parts by weight of the epoxidized glycerides of unsaturated straight-chain $C_{18-22}$ fatty acids,
d) 10 to 50 parts by weight and, more particularly, 20 to 40 parts by weight of the ketofatty acid glycerides corresponding to general formula I and, optionally, e) 10 to 40 parts by weight and, more particularly, 16 to 30 parts by weight typical flow promoters,
f) 0 to 300 parts by weight typical impact modifiers,
g) 2 to 10 parts by weight typical co-stabilizers,
h) 0 to 6.0 parts by weight oxidized polyethylene and/or
k) 0 to 10 parts by weight complex esters of
  i) aliphatic, cycloaliphatic and/or aromatic dicarboxylic acids containing 2 to 22 carbon atoms in the molecule,
  ii) aliphatic polyols containing 2 to 6 hydroxyl groups in the molecule and
  iii) aliphatic monocarboxylic acids containing 12 to 34 carbon atoms in the molecule,
  in which the molar ratio of components i, ii and iii to one another is approximately $$n-1 : n : nm-2(n-1)$$

where n is an integer of 2 to 11 and m represents the OH functionality of the polyol.

The typical flow promoters mentioned above are known to the expert, cf. the above-cited Kunststoffhandbuch by Becker/Braun, pages 595–608. They are generally special commercially available polymers, for example based on methacrylates. The same applies to the above-mentioned impact modifiers, cf. the above-cited Kunststoffhandbuch by Becker/Braun, pages 712-726. Commercially available impact modifiers based on methacrylate/butadiene/styrene copolymers are preferred.

The co-stabilizers mentioned above are, for example, 1,3-diketones according to DE-B 26 00 516, DE-B 27 28 862 and DE-B 27 28 865, alpha-ketoenol esters according to FR-A-23 83 987, alpha-acyl lactones according to DE-B 26 45 870, substituted 1,4-dihydropyridine-3,5-dicarboxylic acids according to DE-B 24 36 007 and pyrrole compounds optionally substituted in the 1-, 2- and/or 3-position according to EP-A 0 022 087.

The oxidized polyethylene optionally added serves as a gloss promoter for the molding compounds and also improves their long-term running properties and is a commercially available product known as a PVC additive.

The above-mentioned complex esters optionally used are disclosed in DE-A 19 07 768.

The present invention also relates to Ca/Zn-stabilized, transparent to glass-clear PVC molding compounds containing (to 100 parts by weight suspension or bulk PVC having K values in the range from 55 to 63)
a) 0.05 to 0.8 part by weight and, more particularly, 0.1 to 0.5 part by weight Ca salts of straight-chain, saturated $C_{8-34}$ and, more particularly, $C_{14-34}$ fatty acids expressed as Ca behenate,
b) 0.03 to 0.2 part by weight and, more particularly, 0.06 to 0.12 part by weight Zn salts of straight-chain or branched, saturated $C_{8-22}$ fatty acids expressed as Zn octoate,
c) 2 to 8 parts by weight and, more particularly, 3 to 6 parts by weight epoxidized glycerides of unsaturated straight-chain $C_{18-22}$ fatty acids having oxirane values of 6 to 8 and iodine values of less than 5 and
d) 0.5 to 3.5 parts by weight and, more particularly, 1.0 to 3.0 parts by weight ketofatty acid glycerides corresponding to general formula I $$R^1COO-CH_2-(R^2COO)CH-CH_2-OOCR^3 \quad (I)$$

in which the groups $R^1COO-$, $R^2COO-$ and $R^3COO-$ represent residues of ketofatty acids containing 16 to 22 carbon atoms and, optionally, residues of fatty acids containing 12 to 22 carbon atoms and 60 to 100% by weight of the groups are derived from ketofatty acids and 40 to 0% by weight from the fatty acids.

Preferred ketofatty acid glycerides corresponding to general formula I have already been mentioned.

Preferred Ca/Zn-stabilized PVC molding compounds according to the invention additionally contain (to 100 parts by weight suspension or bulk PVC)
e) 0.5 to 2.0 parts by weight and, more particularly, 0.8 to 1.5 parts by weight typical flow promoters,
f) 0 to 15 parts by weight typical impact modifiers,
g) 0.1 to 0.5 part by weight typical co-stabilizers,
h) 0 to 0.3 part by weight oxidized polyethylene and/or
k) 0 to 0.6 part by weight complex esters of
  i) aliphatic, cycloaliphatic and/or aromatic dicarboxylic acids containing 2 to 22 carbon atoms in the molecule,
  ii) aliphatic polyols containing 2 to 6 hydroxyl groups in the molecule and
  iii) aliphatic monocarboxylic acids containing 12 to 34 carbon atoms in the molecule, in which the molar ratio of components i, ii and iii to one another is approximately $$n-1 : n : nm-2(n-1),$$

where n is an integer of 2 to 11 and m represents the OH functionality of the polyol.

The additional additives mentioned above have already been discussed.

The present invention also relates to a process for the production of Ca/Zn-stabilized transparent to glass-clear PVC molding compounds, in which the following additions are incorporated in 100 parts by weight suspension or bulk PVC having K values of 55 to 63:
a) 0.05 to 0.8 part by weight and, more particularly, 0.1 to 0.5 part by weight Ca salts of straight-chain, saturated $C_{8-34}$ and, more particularly, $C_{14-34}$ fatty acids expressed Ca behenate,
b) 0.03 to 0.2 part by weight and, more particularly, 0.06 to 0.12 part by weight Zn salts of straight-chain or branched, saturated $C_{8-22}$ fatty acids, expressed as Zn octoate,
c) 2 to 8 parts by weight and, more particularly, 3 to 6 parts by weight epoxidized glycerides of unsaturated straight-chain $C_{18-22}$ fatty acids having oxirane values of 6 to 8 and iodine values of less than 5 and
d) 0.5 to 3.5 parts by weight and, more particularly, 1.0 to 3.0 parts by weight ketofatty acid glycerides corresponding to general formula I $$R^1COO-CH_2-(R^2COO)CH-CH_2-OOCR^3 \quad (I)$$

in which the groups $R^1COO-$, $R^2COO-$ and $R^3COO-$ represent residues of ketofatty acids containing 16 to 22 carbon atoms and, optionally, residues of fatty acids containing 12 to 22 carbon atoms and 60 to 100% by weight of the groups are derived from ketofatty acids and 40 to 0% by weight from the fatty acids.

Preferred ketofatty acid glycerides have already been mentioned.

In another advantageous embodiment of the process according to the invention, the above-mentioned additions e) to k) are incorporated.

The present invention also relates to the use of ketofatty acid glycerides corresponding to general formula I $$R^1COO-CH_2-(R^2COO)CH-CH_2-OOCR^3 \quad (I)$$

in which the groups $R^1COO-$, $R^2COO-$ and $R^3COO-$ represent residues of ketofatty acids containing 16 to 22 carbon atoms and, optionally, residues of fatty acids containing 12 to 22 carbon atoms and 6% to 100% by weight of the groups are derived from ketofatty acids and 40 to 0% by weight from the fatty acids, as lubricants for Ca/Zn-stabilized molding compounds based on PVC or PVC copolymers in a quantity of 0.5 to 3.5 parts by weight and, more particularly, in a quantity of 1.0 to 3.0 parts by weight of the ketofatty acid glycerides to 100 parts by weight PVC or PVC copolymers.

Ketofatty acid glycerides of general formula I preferably used in accordance with the invention have already been mentioned.

The invention is illustrated by the following Examples.

The preparation of ketofatty acid glycerides corresponding to general formula I to be used in accordance with the invention is described first.

A. Mixture of 9- and 10-ketostearic acid triglycerides (9(10)-ketostearic acid triglyceride)

43.6 kg (124 mol, based on the epoxide content) of an epoxidized sunflower oil which had been obtained by epoxidation of a sunflower oil having an oleic acid content of 85% and which had an epoxide oxygen content of 4.55% by weight, a saponification value of 183.0, an iodine value of 2.1 and an acid value of 3.4 was stirred under nitrogen in the presence of 185 g (1.23 mol) sodium iodide for 4.5 h at a temperature of 230° C. After the epoxide oxygen content had fallen to 0.2% by weight, the reaction mixture was cooled to 110° C. The sodium iodide precipitated (70 g, corresponding to 40% by weight of the quantity used) was removed by filtration through an 80 μm filter bag. The crude rearrangement product was filtered in the presence of a filter aid (Celite). A light-brown solid was obtained in a yield of 41.8 kg (corresponding to 96% by weight of the theoretical). It had a ketofatty acid content of 85% by weight, based on the total fatty acid residues present, a carbonyl value of 59, a saponification value of 180, an acid value of 0.5, a sodium content of 110 ppm and a water content of less than 0.1% by weight.

B. Mixture of 6- and 7-ketostearic acid triglycerides (6(7)-ketostearic acid triglyceride)

The desired 6(7)-ketostearic acid triglyceride is obtained in the same way as described in A. from an epoxidized coriander oil, which had been obtained from coriander oil having a petroselic acid content of 85% by weight, with an epoxide oxygen content of 4.84% by weight by stirring in the presence of 5 mol-% sodium iodide (based on the educt): yield 92%. The product had a ketostearic acid content of 85%, a carbonyl value of 61 and a saponification value of 184.

C. 12-ketostearic acid triglyceride.

150 g castor oil and 15 g of a substantially completely hydrogenated Pd/C catalyst (5% Pd) were introduced into a three-necked flask equipped with a thermometer, stirrer, reflux condenser and a glass frit for the introduction of gas. The contents of the flask were heated with stirring to 250° C. while a stream of nitrogen was continuously introduced. After this temperature had been reached, 450 g additional castor oil were added over a period of 1 hour. After the addition, the reaction mixture was vigorously stirred for 2 hours at 250° C. A thin stream of hydrogen was then introduced into the reaction mixture through a glass frit. The reaction was continued with vigorous stirring for about 1 hour. The reaction mixture was cooled to ambient temperature. The catalyst was filtered off. 595 g isomerized castor oil were obtained. The composition of the fatty acid components in the starting product and the end product is shown in Table 1 (the percentages cited are based on gas chromatographically determined area percentages of the methyl esters of the fatty acids after transesterification of the triglycerides with methanol). The particular balance to 100% consists of unidentified compounds.

TABLE 1

| | Fatty acid components in the | |
|---|---|---|
| | Starting product | End product |
| Palmitic acid | 1.0 | 1.2 |
| Oleic acid | 3.7 | 0.0 |

TABLE 1-continued

| | Fatty acid components in the | |
|---|---|---|
| | Starting product | End product |
| Stearic acid | 3.4 | 12.5 |
| Ricinoleic acid | 89.0 | 0.0 |
| 12-Ketostearic acid | 0.0 | 73.5 |
| 12-Hydroxystearic acid | 0.0 | 10.4 |

Repetition of the above-described test with 60 g castor oil and 6.25 g Pd/C (5% Pd; dry weight), the catalyst emanating from an earlier isomerization test and another 190 g castor oil being added to the reaction mixture over a period of 1 hour after the temperature of 250° C. had been reached, followed by vigorous stirring for 2 hours at 250° C. and introduction of a thin stream of hydrogen for another 2 h, produced 247.6 g isomerized castor oil. The analysis of the fatty acid residues is shown in Table 2.

Repetition of the test just described using a palladium catalyst on sulfidized carbon (5% Pd, Engelhard), the catalyst having been completely hydrogenated in an earlier isomerization test, produced 249 g isomerized castor oil of which the fatty acid analysis is also set out in Table 2.

As can be seen from the analyses, a 12-ketostearic acid triglyceride with the highest 12-ketostearoyl content and the lowest 12-hydroxystearoyl content is obtained where the palladium catalyst on sulfidized carbon is used.

TABLE 2

| | Fatty acid components in the end product | |
|---|---|---|
| | Pd/C | Pd/sulfidized C |
| Palmitic acid | 1.5 | 1.4 |
| Oleic acid | 0.0 | 0.0 |
| Stearic acid | 12.5 | 17.1 |
| Ricinoleic acid | 0.0 | 0.0 |
| 12-Ketostearic acid | 75.8 | 78.4 |
| 12-Hydroxystearic acid | 7.4 | 2.6 |

EXAMPLE 1

Production of a PVC molding compound without impact modifier.

In a mechanical mixer, the components listed in Table 3 were mixed at 115° to 120° C. and plasticized on laboratory rollers. The sheets obtained were removed and pressed in a laboratory press at 170° to 200° C. to form 4 mm thick plates. After storage for at least 12 hours at 20° C., these plates were measured for permeability to light (in %, based on the transparency of air) using a Dr. Lange transparency measuring instrument.

EXAMPLE 2

Production of a PVC molding compound with impact modifier.

Example 1 was repeated with addition of 10 parts by weight of an impact modifier.

COMPARISON EXAMPLES 1 AND 2

Examples 1 and 2 were repeated, but with 12-hydroxystearic acid triglyceride instead of the mixture of 9- and 10-ketostearic acid triglyceride.

The abbreviations used in Table 3 have the following meanings;

| | |
|---|---|
| S-PVC, K = 58: | Commercially available suspension PVC having a K value of 58. |
| Impact modifier: | Commercially available impact modifier based on a methacrylate/butadiene/styrene copolymer. |
| Flow promoter: | Commercially available product based on polymethacrylate. |
| Epoxy soybean oil: | Commercially available epoxidized soybean oil having an oxirane value above 6.3 and an iodine value below 2.5. |
| Zn octoate (bas.): | Basic zinc octoate. |
| Triketo-9(10)stearate: | Mixture of 9- and 10-ketostearic acid triglyceride. |
| 12-Hydroxystearate: | 12-Hydroxystearic acid triglyceride |
| Complex ester: | Esterification product of pentaerythritol, adipic acid and stearic acid in molar ratios of 7:6:16. |

Comparison of the transparency measurements for Example 1 and Comparison Example 1 shows the considerable increase in transparency achieved in accordance with the invention. This effect remains intact when 10 parts by weight of the impact modifier, based on PVC used, are added to the PVC compounds.

TABLE 3

| | (Quantities in part by weight) | | | |
|---|---|---|---|---|
| Mixture | Example 1 | Example 2 | Comparison 1 | Comparison 2 |
| S-PVC, K = 58 | 100 | 100 | 100 | 100 |
| Impact modifier | — | 10 | — | 10 |
| Flow promoter | 0.5 | 0.5 | 0.5 | 0.5 |
| Epoxy soybean oil | 5 | 5 | 5 | 5 |
| Stearoyl benzoyl methane | 0.3 | 0.3 | 0.3 | 0.3 |
| Ca behenate | 0.4 | 0.4 | 0.4 | 0.4 |
| Zn octoate (bas.) | 0.08 | 0.08 | 0.08 | 0.08 |
| Triketo-9(10)stearate | 2.5 | 2.5 | — | — |
| 12-Hydroxystearate | — | — | 2.5 | 2.5 |
| Complex ester | 0.2 | 0.2 | 0.2 | 0.2 |
| Oxidized polyethylene | 0.1 | 0.1 | 0.1 | 0.1 |
| Transparency (%) | 71 | 67 | 33 | 42 |

EXAMPLE 3

A PVC mixture having the same composition as in Example 1 was produced in the same way as described in that Example except that the 9(10)-ketostearic acid triglyceride was replaced by a 12-ketostearic acid triglyceride having a low 12-hydroxystearic acid triglyceride content obtained by method C described above. Transparency values comparable with those of Example 1 were obtained.

EXAMPLE 4

A PVC mixture having the same composition as in Example 1 was produced in the same way as described in that Example, except that the 9(10)-ketostearic acid triglyceride was replaced by a 6(7)-ketostearic acid triglyceride obtained by method B described above. The transparency values obtained were comparable with those of Example 1.

We claim;
1. A stabilizer composition effective as an internal lubricant for Ca/Zn-stabilized PVC molding compounds, said composition consisting essentially of
   a) a Ca salt of a saturated straight-chain $C_1$–$C_{34}$ fatty acid,
   b) a Zn salt of a saturated, straight-chain or branched chain $C_1$–$C_{22}$ fatty acid,
   c) an epoxidized glycerides of an unsaturated, straightchain $C_{16}$–$C_{22}$ fatty acid having an oxirane number of about 6 to about 8 and an iodine number of less than 5, and
   d) a ketofatty acid glycerides corresponding to formula I

$$R^1COO-CH_2-(R^2COO)CH-CH_2-OOCR^3 \quad (I)$$

in which the gropus $R^1COO-$, $R^2COO-$ and $R^3COO-$ represent a residue of a ketofatty acid containing 16 to 22 carbon atoms and, optionally, a residue of a fatty acid containing 12 to 22 carbon atoms and about 60% to 100% by weight of said groups are derived from said ketofatty acid and about 40% to 0% by weight from said fatty acid, wherein the ratio of the total weight of said Ca salt of said component a) and said Zn salt of said component b) to the percentage by weight of said ketofatty acid glycerides of said component d) is from about 1:1 to about 1:50.

2. A stabilizer composition as in claim 1 wherein about 70% to about 100% by weight of said groups $R^1COO-$, $R^2COO-$ and $R^3COO-$ in said ketofatty acid glyceride corresponding to formula I are derived from a ketofatty acid containing 16 to 22 carbon atoms.

3. A stabilizer composition as in claim 1 wherein said ketofatty acid residue present in said ketofatty acid glyceride corresponding to formula I is derived from 12-ketostearic acid.

4. A stabilizer composition as in claim 1 wherein said ketofatty acid residue present in said ketofatty acid glyceride corresponding to formula I is derived from a mixture of 9- and 10-ketostearic acids.

5. A stabilizer composition as in claim 1 wherein said ketofatty acid residue present in said ketofatty acid glyceride corresponding to formula I is derived from a mixture of 6- and 7-ketostearic acids.

6. A stabilizer composition as in claim 1 consisting essentially of
   a) about 1 to about 16 parts by weight of said Ca salt of a saturated straight-chain $C_{14}$–$C_{34}$ fatty acid expressed as Ca behenate,
   b) about 0.6 to about 4.0 parts by weight of said Zn salt of a saturated, straight-chain or branched $C_8$–$C_{22}$ fatty acid expressed as Zn octoate,
   c) about 40 to about 160 parts by weight of said epoxidized glyceride of an unsaturated straight-chain $C_{16}$–$C_{22}$ fatty acid,
   d) about 10 to about 50 parts by weight of said ketofatty acid glyceride corresponding to said formula I, and optionally,
   e) about 10 to about 40 parts by weight of a flow promoter,
   f) 0 to about 300 parts by weight of an impact modifier,
   g) about 2 to about 10 parts by weight of a costabilizer,
   h) 0 to about 6.0 parts by weight of oxidized polyethylene, and
   k) 0 to about 10 parts by weight of a complex ester selected from the group consisting of
      i) aliphatic, cycloaliphatic or aromatic dicarboxylic acid containing 2 to 22 carbon atoms in the molecule,
      ii) aliphatic polyol containing 2 to 6 hydroxyl groups in the molecule, and iii) aliphatic monocarboxylic acid containing 12 to 34 carbon atoms in the molecule, in which the molar ratio of components i, ii and iii to one another is about $$n-1 : n : nm-2(n-1)$$

where n is an integer of 2 to 11 and m represents the OH functionality of the polyol, all weights being based on the weight of said composition.

7. A Ca/Zn-stabilized, transparent to glass clear PVC molding compound containing per, 100 parts by weight of a suspension or bulk PVC having a K value of from about 55 to about 63, a stabilizer composition effective as an internal lubricant and consisting essentially of:
   a) about 0.05 to about 0.8 part by weight of a Ca salt of a saturated straight-chain $C_8-C_{34}$ fatty acid expressed as Ca behenate,
   b) about 0.03 to about 0.2 parts by weight of a Zn salt of a saturated straight-chain or branched $C_8-C_{22}$ fatty acid expressed as Zn octoate,
   c) about 2 to about 8 parts by weight of an epoxidized glyceride of an unsaturated straight-chain $C_{16}-C_{22}$ fatty acid having an oxirane number of about 6 to about 8 and an iodine number of less than 5, and
   d) about 0.05 to about 3.5 parts by weight of a ketofatty acid glyceride corresponding to formula I

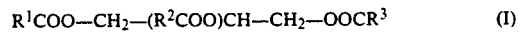

$$R^1COO-CH_2-(R^2COO)CH-CH_2-OOCR^3 \quad (I)$$

in which the groups $R^1COO-$, $R^2COO-$, and $R^3COO-$ represent a residue of a ketofatty acid containing 16 to 22 carbon atoms and, optionally, a residue of a fatty acid containing 12 to 22 carbon atoms and about 60% to about 100% by weight of said gropus are derived from said ketofatty acid and about 40% to 0% by weight from said fatty acid.

8. A Ca/Zn-stabilized PVC molding compound as in claim 7 wherein from about 70% to about 100% by weight of said groups $R^1COO-$, $R^2COO-$, and $R^3COO-$ in said ketofatty acid glyceride corresponding to formula I are derived from a ketofatty acid containing 16 to 22 carbon atoms.

9. A Ca/Zn-stabilized PVC molding compound as in claim 7 wherein said ketofatty acid residue present in said ketofatty acid glyceride corresponding to formula I is derived from 12-ketostearic acid.

10. A Ca/Zn-stabilized PVC molding compound as in claim 7 wherein said ketofatty acid residue present in said ketofatty acid glyceride corresponding to formula I is derived from a mixture of 9- and 10- ketostearic acids.

11. A Ca/Zn-stabilized PVC molding compound as in claim 7 wherein said ketofatty acid residue present in said ketofatty acid glyceride corresponding to formula I is derived from a mixture of 6- and 7-ketostearic acids.

12. A Ca/Zn-stabilized PVC molding compound as in claim 7 further containing per 100 parts by weight of said suspension of bulk PVC
   e) about 0.5 to about 2.0 parts by weight of a flow promoter,
   f) 0 to about 15 parts by weight of an impact modifier,
   g) about 0.1 to about 0.5 parts by weight of a costabilizer,
   h) 0 to about 0.3 parts by weight of oxidized polyethylene, and
   k) 0 to about 0.6 parts by weight of a complex ester selected from the group consisting of i) aliphatic, cycloaliphatic or aromatic dicarboxylic acid containing 2 to 22 carbon atoms in the molecule, ii) aliphatic polyol containing 2 to 6 hydroxyl groups in the molecule, and iii) aliphatic monocarboxylic acid containing 12 to 34 groups in the molecule, and in which the molar ratio of components i, ii and iii to one another is about $$n-1; n : nm-2(n-1)$$

where n is an integer of 2 to 11 and m represents the OH functionality of the polyol.

13. The process of producing a Ca/Zn-stabilized, transparent to glass clear PVC molding compound, comprising adding to about 100 parts by weight of a suspension or bulk PVC having a K value of from about 55 to about 63, a stabilizer composition effective as an internal lubricant consisting essentially of
   a) about 0.05 to about 0.8 part by weight of a Ca slat of a saturated straight-chain $C_8-C_{34}$ fatty acid expressed as Ca behenate,
   b) about 0.03 to about 0.02 part by weight of a Zn salt of a saturated straight-chain or branched $C_8-C_{22}$ fatty acid expressed as Zn octoate,
   c) about 2 to about 8 by weight of an epoxified glyceride of an unsaturated straight-chain $C_{16}-C_{22}$ fatty acid having an oxirane number of about 6 to 8 and an iodine number of less than 5, and
   d) about 0.5 to about 3.5 parts by weight of ketofatty acid glyceride corresponding to formula I

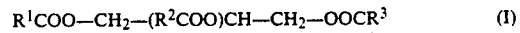

$$R^1COO-CH_2-(R^2COO)CH-CH_2-OOCR^3 \quad (I)$$

in which the groups $R^1COO-$, $R^2COO-$, and $R^3COO-$ represent a residue of a ketofatty acid containing 16 to 22 carbon atoms and, optionally, a residue of a fatty acid containing 12 to 22 carbon atoms and about 60% to 100% by weight of said groups are derived from said ketofatty acid and about 40% to 0% by weight from said fatty acid.

14. A process as in claim 13 wherein from about 70% to about 100% by weight of said groups $R^1COO-$, $R^2COO-$ and $R^3COO-$ in said ketofatty acid glyceride corresponding to formula I are derived from a ketofatty acid containing 16 to 22 carbon atoms.

15. A process as in claim 13 wherein said ketofatty acid residue present in said ketofatty acid glyceride corresponding to formula I is derived from 12-ketostearic acid.

16. A process as in claim 13 wherein said ketofatty acid residue present in said ketofatty acid glyceride corresponding to formula I is derived from a mixture of 9- and 10-ketostearic acids.

17. A process as in claim 13 wherein said ketofatty acid residue present in said ketofatty acid glyceride corresponding to formula I is derived from a mixture of 6-and 7-ketostearic acids.

18. A process as in claim 13 including further adding to said PVC molding compound:
   e) abut 0.5 to about 2.0 parts by weight of a flow promoter,
   f) 0 to about 15 parts by weight of an impact modifier,
   g) about 0.1 to about 0.5 parts by weight of a costabilizer,
   h) 0 to about 0.3 parts by weight of oxidized polyethylene, and k) 0 to about 0.6 parts by weight of a complex ester selected from the group consisting of
   i) aliphatic, cycloaliphatic or aromatic dicarboxylic acid containing 2 to 22 carbon atoms in the molecule,
   ii) aliphatic polyol containing 2 to 6 hydroxyl groups in the molecule, and
   iii) aliphatic monocarboxylic acid containing 12 to 34 carbon atoms in the molecule, in which the molar ratio of components i, ii and iii to one another is about $$n-1 : n : nm-2(n-1)$$

where n is an integer of 2 to 11 and m represents the OH functionality of the polyol.

* * * * *

UNITED STATES PATENT AND TRADEMARK OFFICE
CERTIFICATE OF CORRECTION

PATENT NO. : 5,302,644
DATED : April 12, 1994
INVENTOR(S) : Worscheh et. al.

It is certified that error appears in the above-indentified patent and that said Letters Patent is hereby corrected as shown below:

In claim 1, column 9, line 65, "$C_1-C_{34}$", should read:
-- $C_8-C_{34}$ --.

In claim 1, column 9, line 68, "$C_1-C_{22}$", should read:
-- $C_8-C_{22}$ --.

In claim 13, column 12, line 28, "epoxidified", should read:
-- epoxidized --.

Signed and Sealed this

Twenty-eight Day of March, 1995

Attest:

BRUCE LEHMAN

*Attesting Officer*     *Commissioner of Patents and Trademarks*